United States Patent
Schultheis et al.

(10) Patent No.: US 10,794,743 B2
(45) Date of Patent: Oct. 6, 2020

(54) THERMAL, FLOW MEASURING DEVICE AND A METHOD FOR MANUFACTURING A THERMAL, FLOW MEASURING DEVICE

(71) Applicant: Endress+Hauser Flowtec AG, Reinach (CH)

(72) Inventors: Hanno Schultheis, Hermrigen (CH); Alexander Grün, Lörrach (DE); Axel Pfau, Wehr (DE)

(73) Assignee: Endress+Hauser Flowtec AG, Reinach (CH)

( * ) Notice: Subject to any disclaimer, the term of this patent is extended or adjusted under 35 U.S.C. 154(b) by 130 days.

(21) Appl. No.: 15/769,788

(22) PCT Filed: Sep. 8, 2016

(86) PCT No.: PCT/EP2016/071204
§ 371 (c)(1),
(2) Date: Apr. 20, 2018

(87) PCT Pub. No.: WO2017/067701
PCT Pub. Date: Apr. 27, 2017

(65) Prior Publication Data
US 2018/0306620 A1    Oct. 25, 2018

(30) Foreign Application Priority Data
Oct. 23, 2015    (DE) .................. 10 2015 118 126

(51) Int. Cl.
*G01F 1/684* (2006.01)
*G01F 1/69* (2006.01)

(52) U.S. Cl.
CPC .............. *G01F 1/6842* (2013.01); *G01F 1/69* (2013.01)

(58) Field of Classification Search
CPC .......... G01F 1/08; G01F 1/684; G01F 1/6842; G01F 15/18
See application file for complete search history.

(56) References Cited

U.S. PATENT DOCUMENTS

| 2001/0032503 A1 | 10/2001 | Schrittenlacher |
| 2002/0100320 A1 | 8/2002 | Smith et al. |

(Continued)

FOREIGN PATENT DOCUMENTS

| CN | 101311686 A | 11/2008 |
| CN | 102095479 A | 6/2011 |

(Continued)

OTHER PUBLICATIONS

Search Report for German Patent Application No. 10 2015 118 126.6, German Patent Office, dated Apr. 11, 2016, 6 pp.

(Continued)

*Primary Examiner* — Justin N Olamit
(74) *Attorney, Agent, or Firm* — Kelly J. Smith; Endress+Hauser (USA) Holding Inc.

(57) ABSTRACT

A thermal, flow measuring device comprising a sensor with a metal sensor housing, which includes a cap with a lateral surface and an end face, wherein the sensor housing has at least first and second pin sleeves, which protrude starting from the end face, wherein the sensor housing has a first heater in a first of the two pin sleeves and a temperature sensor in a second of the two pin sleeves for ascertaining a temperature of the medium; wherein the end face of the cap is divided at least into a base area and at least a first planar area inclined relative to the base area by an angle, wherein a second heater is arranged on an inner surface of the cap in the region of this first area.

12 Claims, 1 Drawing Sheet

(56) References Cited

U.S. PATENT DOCUMENTS

2015/0192442 A1 7/2015 Olin
2015/0292928 A1 10/2015 Pfau et al.

FOREIGN PATENT DOCUMENTS

| | | |
|---|---|---|
| CN | 102575951 A | 7/2012 |
| CN | 104237558 A | 12/2014 |
| CN | 104335017 A | 2/2015 |
| CN | 104797941 A | 7/2015 |
| DE | 29907566 U1 | 8/1999 |
| DE | 10216532 A1 | 10/2003 |
| DE | 102007042789 A1 | 3/2009 |
| DE | 102012109237 A1 | 4/2014 |
| DE | 102013108099 A1 | 4/2014 |
| JP | 09304147 A | 11/1997 |

OTHER PUBLICATIONS

Search Report for International Patent Application No. PCT/EP2016/071204, WIPO, dated Dec. 14, 2016, 10 pp.

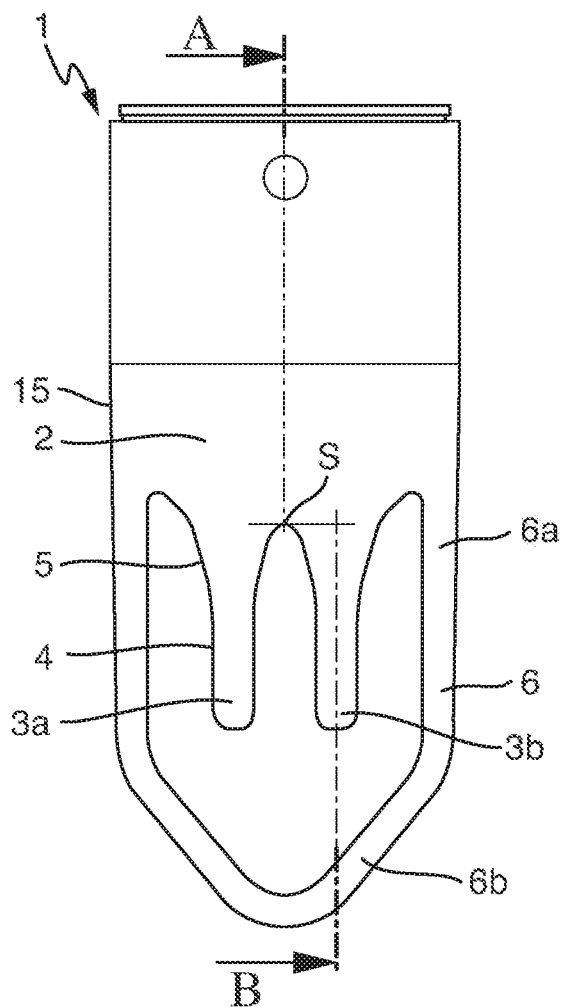
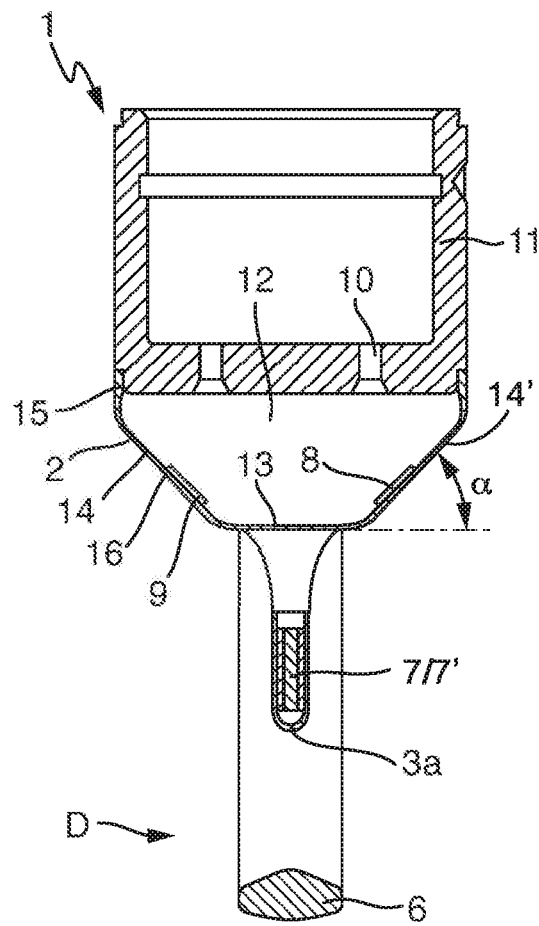
Fig. 1
Fig. 2

THERMAL, FLOW MEASURING DEVICE AND A METHOD FOR MANUFACTURING A THERMAL, FLOW MEASURING DEVICE

CROSS-REFERENCE TO RELATED APPLICATIONS

The present application is related to and claims the priority benefit of German Patent Application No. 10 2015 118 126.6, filed on Oct. 23, 2015 and International Patent Application No. PCT/EP2016/071204 filed on Sep. 8, 2016, the entire contents of which are incorporated herein by reference.

TECHNICAL FIELD

The present invention relates to a thermal, flow measuring device as defined in the preamble of claim 1 and to an arrangement with a tube or pipe and the thermal, flow measuring device.

BACKGROUND

Known are thermal, flow measuring devices, which have sensor housings with two pin sleeves. Arranged in a first of these two pin sleeves is a heater, e.g. a heated resistance thermometer. Arranged in a second of these pins sleeves is a temperature sensor for ascertaining the temperature of the medium. The temperature sensor can likewise be embodied as a heatable resistance thermometer, which, however, is not actively heated in its operating state as a temperature sensor. By means of these two above-described sensor elements, a reliable flow measurement can occur.

A thermal, flow measuring device is additionally known from DE 10 2013 108 099 A1. In this case, a flow optimized geometry is described, which due to specified recirculation regions and adjoining boundary layers enables an especially exact flow measurement.

SUMMARY

Starting from the aforementioned state of the art, an object of the present invention is to provide a thermal, flow measuring device, in which, supplementally to the flow measurement, another functionality is provided in flow optimized manner.

The present invention achieves this object by a thermal, flow measuring device as defined in claim 1.

A thermal, flow measuring device of the invention includes a sensor with a sensor housing, which is preferably embodied of metal.

The sensor housing is preferably suitable for connecting to a plug-in apparatus and/or a tube or pipe wall. A plug-in apparatus can be e.g. a framework, on whose end the aforementioned sensor housing is arranged. This framework is then inserted into the tube through a hole, which is most often arranged with reference to the gravitational field at the uppermost point of a tube. The environmentally bounding wall of the sensor housing is, thus, partially or completely exposed to a flow of a measured medium located in the tube. Alternatively to the plug-in apparatus, the metal sensor housing can also be secured directly or by means of a tubular extension fixedly to a tube wall. The type of emplacement of the sensor housing, or the hollow body, is, however, of only subordinate meaning in the context of the present invention.

The sensor housing includes a cap. The sensor housing additionally includes at least two pin sleeves. Especially preferably, the pin sleeves can also be associated with the cap, thus be part of the cap.

The cap includes an end face, which is divided into a number of segment like areas. In such case, the end face includes at least one base area. This base area can be embodied, for example, flat or rounded.

The at least two pin sleeves of the sensor housing protrude from the base area and extend in the installed state preferably into the interior of a tube or pipe. The pin sleeves can be embodied e.g. cylindrically or prismatically.

Arranged in the first pin sleeve, especially in a terminal section of such pin sleeve, is a first heater and arranged in the second pin sleeve, especially in a terminal section of such pin sleeve, is a temperature sensor for ascertaining the temperature of the medium.

According to the invention, the end face of the cap includes a second area, which is inclined from the base area by a certain angle and which is flat. On this second area, a second heater is placed. This can be utilized for detection of a sensor drift or, in combination with an optional third heater, for direction detection.

In this way, supplementally to the flow measurements, one or more other functionalities are integrated or implementable in a flow optimized geometry of a sensor housing. In this geometry, the two heaters impede only to a very small degree.

Advantageous characteristics are subject matter of the dependent claims.

It is especially advantageous for direction detection that the end face of the cap is divided into at least a second planar area inclined by an angle relative to this base area, wherein on an inner surface of the cap in the region of this second area a third heater is arranged.

Advantageously, the sensor housing has a longitudinal axis and a first cutting plane, on which this longitudinal axis is arranged, wherein the cap is constructed mirror symmetrically with respect to a first symmetry plane, which is coincident with the first cutting plane. In this way, a bidirectional flow can be enabled.

The sensor housing includes advantageously a second cutting plane, or defines such a second cutting plane, on which the longitudinal axis of the sensor housing is arranged. The cap is advantageously constructed mirror symmetrically with a second symmetry plane, which is coincident with the aforementioned second cutting plane, wherein preferably the first and the second cutting planes are arranged perpendicular to one another.

The flow measuring device needs, in the case of a symmetric construction for so-called bidirectional flow measurement, only a calibration of one flow direction.

The sensor housing advantageously includes a cutting plane, or defines such a cutting plane, which is arranged perpendicular to the longitudinal axis of the sensor housing. The angle of the first and/or second inclined area is preferably inclined relative to this cutting plane by an angle of greater than 5°, especially preferably an angle of 10°-70°, quite especially preferably an angle of 35-55°.

In order to achieve an as direct as possible heat transfer, the cap advantageously has, at least in the region of the first and/or the second area, a wall thickness of less than 0.5 mm.

The thermal, flow measuring device can advantageously have an evaluation unit, which is equipped for detecting a sensor drift based on power-proportional measured values ascertained for the second and/or third heater. The evaluation unit can comprise e.g. a memory unit with a database and a computing unit. In the case of sensor drift, the difference between the power coefficient of the first heater and the power coefficient of the second and/or third heater should exceed a predetermined desired value. Then a display can announce that a sensor drift is present. Comparison algorithms are likewise applied in the case of direction detection, wherein, in such case, the measured values of the second as well as also of the third heater are taken into consideration.

Other advantageous embodiments of a sensor housing for a thermal, flow measuring device will now be explained.

For flow guidance, the sensor housing, especially the cap, can have an arch, which bridges over, or frames in, the pin sleeves. In this way, a lessened rotation angle sensitivity of the flow measuring device is achieved.

Another advantageous arrangement includes a thermal, flow measuring device as claimed in one of the preceding claims and a pipe or tube, through which a measured medium flows in a first flow direction, wherein the sensor housing of the thermal, flow measuring device is arranged in the pipe or tube and wherein the thermal, flow measuring device has an evaluation system, which is equipped for registering the flow of the measured medium in the first flow direction and in a second flow direction opposite to the first flow direction based on the measured values, e.g. the power coefficients, of the second and the third heaters. The evaluation unit can be formed e.g. by a computing unit containing corresponding desired value specifications.

The pin sleeves can advantageously have an additional section, which preferably transitions into the base area, with a lateral surface, which has a maximum separation d2 about the longitudinal axis. In the case of a frustoconically shaped, lateral surface, the maximum separation corresponds to the greatest radius of the lateral surface, which usually at the same time forms the fictive base area of the truncated cone. This base area does, of course, not exist, since the sleeve of the sensor housing is hollow, so that a temperature sensor in the assembly of the thermal, flow measuring device is introducible via the hollow body and a terminal opening of the pin sleeve into the pin sleeve and can be led to, or threaded into, the first section. This stepped arrangement enables a lower vibration sensitivity of the pin sleeves.

In order that the individual sensor elements are especially well thermally decoupled and also produce little turbulence, the maximum inner diameter of the first section is advantageous less than or equal to 4 mm, preferably less than or equal to 3 mm.

Advantageously, each of the pin sleeves has at least in the terminal section a wall thickness of less than 0.5 mm, preferably between 0.1-0.4 mm. The small wall thickness enables a very direct and fast heat transfer to the measured medium. In this way, fast response times of the sensor in the case of changed flow velocity of the measured medium are enabled. However, thin pin sleeves decrease the eigenfrequency of the pin sleeves and the sensor housing as a whole. This can, however, be advantageously compensated by the stepped shape of the pin sleeves of the invention.

In this context, the pin sleeves are advantageously composed of a number of sections, including thus e.g. a first terminal section, in which the heater or the temperature sensor for ascertaining the temperature of the medium is arranged.

The first section can advantageously have a cylindrical and/or conical, outer surface. The connecting of the heater can preferably occur by means of a copper bridge, such as described, for example, in DE 10 2008 015 359 A1.

Additionally, a further section of the pin sleeves can be provided. This other section of the pin sleeves can have a frustoconically-shaped, lateral surface. Conical embodiment of the section arranged toward the hollow body increases the eigenfrequency of the pin sleeves.

The wall thickness of the cap varies in the different regions, thus e.g. the end face, the surfaces with the second and third heaters and the pin sleeves, by less than 0.1 mm, preferably by less than 0.05 mm. In this way, an as uniform as possible heat distribution is achieved.

For pressure stability and chemical stability, the sensor housing is composed advantageously of steel, Hastelloy and/or titanium.

The cap can be embodied as one piece and the pin sleeves can be connected together with the end face of the cap seam freely, especially weld seam freely. The terminology, seam free, means in the context of the present invention that neither a weld seam nor an adhesive- or solder or braze seam is present as connection between the pin sleeves and the hollow body. In the case of welded pin sleeves, the heat transfer changes with temperature, which can lead in the case of a greater temperature change to a measurement error. Such is, however, advantageously prevented in the case of this embodiment.

It is especially advantageous that the metal sensor housing is embodied as a monolithic component. The means that the sensor housing is manufactured completely of one material.

Advantageously, at least one terminally located section of one of the two pin sleeves has a cylindrical and/or conical lateral surface with a diameter and the terminal section extends over a length, wherein the ratio of length to diameter is greater than or equal to five, preferably greater than or equal to seven. In the case of a conical lateral surface, the diameter is ascertained by averaging.

The length of the terminal section can advantageously be at least 2 mm, preferably 3-10 mm.

The total length of a pin sleeve can preferably be at least 10 mm.

The sensor housing of the flow measuring device of the invention can advantageously be produced by means of a generative manufacturing method, preferably by means of a radiation melt method. While corresponding sensor housings are also implementable via other manufacturing methods, thus e.g. by primary forming methods, especially by metal injection molding, it has been found that especially good manufacturing tolerances and especially thin walled components are attainable with the aforementioned preferred manufacturing method.

BRIEF DESCRIPTION OF THE DRAWING

The invention will now be explained in greater detail based on an example of an embodiment and with the help of the appended drawing. The description and the figures are by way of example and are not intended to limit the scope of protection of the present invention. The figures of the drawing show as follows:

FIG. 1 shows a side view of a first embodiment of a sensor housing of a thermal, flow measuring device of the invention; and FIG. 2 shows a sectional view of the sensor housing of FIG. 1.

DETAILED DESCRIPTION

Conventional thermal, flow measuring devices use usually two heatable resistance thermometers, which are embodied as equally as possible, and arranged, most often, in pin-shaped metal sleeves, so-called stingers or prongs, or in cylindrical metal sleeves, which are in thermal contact with the medium flowing through a measuring tube or through the pipeline. For industrial application, the two resistance thermometers are usually installed in a measuring tube; the resistance thermometer can, however, also be directly mounted in the pipeline. One of the two resistance thermometers is a so-called active sensor element, which is heated by means of a heating unit. Provided as heating unit is either an additional resistance heater, or the resistance thermometer is a resistance element, e.g. an RTD (Resistance Temperature Device) sensor, which is heated by conversion of electrical power, e.g. by a corresponding variation of the measuring electrical current. In the field of thermal flow measurement, the active sensor element is also often called the heater. The second resistance thermometer is a so-called passive sensor element: It measures the temperature of the medium.

Usually, in a thermal, flow measuring device, a heatable resistance thermometer is so heated that a fixed temperature difference is established between the two resistance thermometers. Alternatively, it is also known to supply via a control unit a constant heating power.

If there is no flow in the measuring tube, then an amount of heat constant with time is required for maintaining the specified temperature difference. If, in contrast, the medium to be measured is moving, the cooling of the heated resistance thermometer depends essentially on the mass flow of the medium flowing past it. Since the medium is colder than the heated resistance thermometer, heat is transported away from the heated resistance thermometer by the flowing medium. In order, thus, in the case of a flowing medium, to maintain the fixed temperature difference between the two resistance thermometers, an increased heating power is required for the heated resistance thermometer. The increased heating power is a measure for the mass flow of the medium through the pipeline. The heating power can be described by a so-called power coefficient PC.

If, in contrast, a constant heating power is supplied, then, as a result of the flow of the medium, the temperature difference between the two resistance thermometers lessens. The particular temperature difference is then a measure for the mass flow of the medium through the pipeline, or through the measuring tube, as the case may be.

There is, thus, a functional relationship between the heating energy needed for heating the resistance thermometer and the mass flow through a pipeline, or through a measuring tube, as the case may be. The dependence of the heat transfer coefficient on the mass flow of the medium through the measuring tube, or through the pipeline, is utilized in thermal, flow measuring devices for determining the mass flow. Devices, which operate on this principle, are produced and sold by the applicant under the marks, 't-switch', 't-trend' and 't-mass'.

FIG. 1 shows details of a special variant of a thermal, flow measuring device. In such case, one sees especially the housing of a measuring transducer of a thermal, flow measuring device, which is subsequently referred to herein as sensor housing 1. This housing is preferably manufactured of metal and can be embodied as a plug-in sensor or it can be affixed, in given cases, with an intermediate piece, to the inner surface of a measuring tube.

In addition to the measuring transducer, the thermal, flow measuring device includes, of course, also an evaluation unit, which, however, is not shown, for reasons of perspicuity.

The sensor housing 1 to be described here for a measuring transducer represents only an especially preferred embodiment of the invention and is not intended to limit the scope of protection of the present invention.

Sensor housing 1 includes a cap 2, which is placed on a metal hollow body 11 and connected therewith. Cap 2 includes a lateral surface 15 and an end face 16. Protruding from the end face 16 are at least two pin sleeves 3a, and 3b, which are associated with the cap 2.

The hollow body includes holes 10 to serve as electrical cable guides. The totality of the cap 2 with the pin sleeves 3a, 3b and an adjoining surface of the hollow body 12 defines, apart from the aforementioned holes 10, a hollow space 12. Cap 2 can be placed on the hollow body 11 and connected therewith. Connection can occur e.g. by welding or especially preferably by joining involving deformation of material.

End face 16 includes a plate-shaped base area 13, which is shown in FIG. 2 as a planar area, and at least one, preferably, however, two, inclined surfaces 14, 14'. The base area can, however, also be rounded. Sensor housing 1 has a longitudinal axis A. The sensor housing is preferably mirror symmetrically embodied about two symmetry planes, wherein the two symmetry planes are perpendicular to one another and the longitudinal axis of the sensor housing forms the intersection of the two planes.

The at least two pin sleeves 3a and 3b each have a longitudinal axis B, which, in each case, extends in parallel with the longitudinal axis A and protrudes from the end face 16, especially the base area 13, of the cap 2. Each of the pin sleeves 3a, 3b has an end face.

The geometric embodiment of a pin sleeve 3a or 3b is such that, starting from the end face of the pin sleeve, there extends, firstly, a first section 4 with a cylindrical pin sleeve wall and a first constant, cylinder diameter d1. Then, the pin sleeve transitions to a second section 5, which is frustoconically shaped and in the case of which the diameter d gradually increases in the course of the frustum to the base area 13. The pin sleeves 3a and 3b have a length l1 of at least 10 mm.

Embodiments with pin sleeves 3a and 3b of changing diameter enable a better introduction and positioning of a heating element and/or a temperature sensor in a pin sleeve through the terminal opening at the end of the pin sleeve away from the medium.

Arranged in the first section 4 of a first of the two pin sleeves 3a and 3b is a heater 7. This can also be e.g. a heatable resistance thermometer. Heater 7 need not absolutely contact the end face or cylinder lateral surface of the pin sleeve, but, instead, can preferably be thermally coupled with the wall of the pin sleeve via a copper bridge. The same holds also for the additional, optional pin sleeves. A corresponding arrangement and its advantages are described in detail in DE 10 2008 015 359 A1.

Arranged in the first section 4 of the second of the two pin sleeves 3a and 3b is a temperature sensor 7' for ascertaining the temperature of the medium. This can likewise be embodied as a heatable resistance thermometer, wherein during operation of the thermal, flow measuring device preferably, in each case, one of the resistance thermometers can be actively heated and one of the resistance thermometers can be unheated. Thus, the heater 7 and the temperature sensor 7' can be constructively equally embodied and equally arranged in their pin sleeves.

The wall thickness of the pin sleeves 3a and 3b amounts at least in the section 4 to less than 0.5 mm, preferably less than or equal to 0.4 mm, especially 0.1 to 0.4 mm. Due to the thin wall thickness, an especially favorable heat transfer can be achieved.

The length l2 of this section 8a can be at least 2 mm, preferably, however, 3-10 mm.

The ratio of the length l2 to the diameter d1 for the first section 8a is preferably greater than 5, especially preferably equal to or greater than 7.

In a preferred embodiment of the invention, the average ratio $l1/d_{average\ value}$ for an entire pin sleeve amounts preferably to greater than 4, wherein the diameter always is with reference to the particular length of the section of the pin sleeve, in which the diameter is actually present. In the case of a conical frustum, such as in section 5, an averaging of the diameter can occur.

Housing 1 can preferably be manufactured completely of metal. Alternatively, also only the cap with the pin sleeves can be manufactured of metal. As especially preferred metal, steel can be utilized. Alternatively, e.g. for strongly-corrosive media, also titanium or Hastelloy can be utilized as wall material.

Additionally, the housing can be provided with an external metal coating, in order, in given cases, to increase the resistance to certain media. This external coating according to the present invention is not, however, part of the housing 2, but, instead, serves as a layer of material applied supplementally onto the housing.

In an arrangement of the thermal, flow measuring device in a tube or pipe, e.g. in a process installation, the first and second pin sleeves 3a and 3b extend into the lumen, thus into the interior of the tube or pipe, for example, into the interior of the measuring tube.

The hollow body 11 is cylindrical in the embodiments of FIGS. 1 and 2. It can, however, also have another shape, e.g. be frustoconically shaped or have the shape of a truncated pyramid.

The cap includes in the cross-sectional view of FIG. 2 the two planar surfaces 14. In DE 10 2013 108 099 A1, to which comprehensive reference is taken in the context of the present invention, the contour of a corresponding cap is described in detail, however, without pin sleeves.

Alternatively to the example of an embodiment in DE 10 2013 108 099 A1, a corresponding cap can also be cylindrically embodied and have on its surface at the end the two planar surfaces 14, which can be formed from the material of the cap by form converting methods, such as e.g. by pressing.

All examples of embodiments have a first connecting axis extending between the pin sleeves 3a and 3b, and between their longitudinal axes B. The longitudinal axes define a cutting plane S, which is perpendicular to such longitudinal axes. The thermal, flow measuring device is flowed against, i.e. struck, at an angle of 80-100°, especially 83-97°, by a measured medium on this cutting plane S in the case of arrangement of the thermal, flow measuring device in a tube or pipe. Ideally, the flow direction is, however, at 90° to the first connecting axis.

The two planar surfaces have, in each case, a geometric center of gravity, or center of area. A second connecting axis is defined by this center of area of an area 14 and the midpoint between the longitudinal axes of the two pin sleeves on the connecting axis. This second connecting axis is preferably at the the angle of 90° to the first connecting axis on the cutting plane S. A lengthening of the second connecting axis can preferably also pass through the center of area of the second area 14.

The two surfaces 14 are defined by the outer contour of the wall of the cap 2. Preferably, the wall of the cap has a wall thickness of less than 0.5 mm. The wall thickness difference between the individual sections of the cap can preferably be less than 0.1 mm.

Arranged along the inner contour of the surfaces is preferably at least one heater 8 or 9, e.g. in the form of a heatable resistance thermometer. In an especially preferred embodiment of the invention, which is also shown in FIG. 2, heaters 8, 9 are arranged on each of the two surfaces 14, thus a first heater 8 and a second heater 9.

Instead of two surfaces, also only one area 14 can be provided with a heater, which is arranged in the installed state in, or counter to, the flow direction D.

In order to achieve an optimal flow striking geometry, the area 14 is, or the areas 14 are, inclined relative to the cutting plane S at an angle α of preferably greater than 5°, especially preferably 10°-70° and quite especially preferably 35-55°. The inclination occurs perpendicularly from the cutting plane S.

FIG. 2 shows schematically a flow of the measured medium in a flow direction D striking on the sensor housing 1. By the inclination of the surfaces, a thin boundary layer of the measured medium is produced on the first area 14, as the flow strikes it.

Formed on the second area 14' inclined from the flow is a so called recirculation region and, in given cases, in the case of fast flow velocities, even a shedding of the flow. This is associated with a differently strong removal of the heat, so that the heaters 8 and 9 arranged on the surfaces 14, 14' have different power consumptions, and different power coefficients. Furthermore, the struck, inclined area leads to the formation of a stagnation point.

By targeted provision of recirculation regions and boundary layers, the flow along the heating area is specially embodied.

The general method for flow direction detection is described in the documents DE 10 2009 045 956 A1 and DE 10 2010 040 285 A1, to which comprehensive reference is taken in the context of the present invention.

There occurs, in such case, the ascertaining of a decision coefficient DC based on two power coefficients, power coefficients PC1 and PC2. In the present case, this concerns a power coefficient PC1 of the heater in one of the pin sleeves 3a or 3b and a second power coefficient of the heater 8 or 9 in the cap 2. The decision coefficient is ascertained as follows DC=(PC2−PC1)/PC2. Through reconciliation of the decision coefficient with a limit value, it can then be decided, from which direction the flow D is flowing through a pipe, or measuring tube, as the case may be. Significantly, the power coefficient of the heater 8 or 9 in the cap changes, depending on the direction from which the flow strikes the sensor. For the direction detection, preferably at least two heaters 8 and 9 are arranged in the cap.

The inclined surfaces 14, 14' with the heaters 8 and 9 also have different degrees of soiling than the pin sleeves 3a and 3b. Therefore, by ratio formation of e.g. the power coefficient of the heater in the first or second pin sleeve 3a, 3b and the power coefficient of a heater 8 or 9 of the cap 2, an estimate of the sensor drift over the operating time of the thermal, flow measuring device can be made. In given cases, a quantifying of the sensor drift can occur and especially preferably a compensating of the sensor drift in the case of the flow measurement. For the display and, in given cases, quantifying of a sensor drift, one heater 8 or 9 arranged in the cap can be sufficient.

Furthermore, the housing 1 includes an arch 6, which curves around the arrangement of the first and second pin sleeves 3a, 3b and is connected with the cap 2 preferably likewise monolithically and seam freely. This arch serves preferably as a flow guiding element and lessens the rotation angle sensitivity of the sensor. It includes two elongated segments 6a, which protrude from the cap 2 in parallel with the longitudinal axes B of the pin sleeves. Furthermore, the arch includes a connecting element 6b, which connects the two elongated elements and at least reduces vibration of these elements.

A monolithic sensor housing with at least two elongated, thin walled pin sleeves is additionally a manufacturing challenge. By means of precision casting, corresponding structures are manufacturable in cost- and time-consuming manner. The used metal materials must additionally also be suitable for casting. For a successful precision casting, many aspects, such as the cooling speed and, in given cases, reworking steps for surface preparation, must be controlled. Similar disadvantages also occur in the case of primary forming methods, e.g. the so-called metal injection molding, which basically also can be utilized in the context of the invention for manufacture of the sensor housing. A special advantage of the MIM method is a comparatively high manufacturing speed.

Especially preferable are generative manufacturing methods, such as radiation melt methods, such as e.g. selective laser melting, which is also known as the SLM method, in order to manufacture such an object with appropriately thin wall thickness and corresponding length of the pin sleeves.

In the case of an SLM method, metal powder is applied in a thin layer on a surface. The metal powder is then locally completely melted by laser radiation and solidified to a fixed material layer in a coating thickness of typically 15-150 μm. Then, the surface is lowered by the magnitude of the coating thickness and a new material layer applied. In this way, the housing 1 of the measuring transducer is gradually formed. Material stresses and corrosion susceptible seams are not present in such case.

Especially preferably, the cap can be produced in a radiation melt method. The inclined surfaces 14 and 14' are easily reachable for surface reworking, thus e.g. polishing. Therefore, manufacturing related surface roughnesses in the case of the present embodiments can be advantageously lessened by a corresponding surface reworking.

The invention claimed is:

1. A thermal, flow measuring device, comprising:
   a sensor with a metal sensor housing, the metal sensor housing including a cap, the cap including with a lateral surface, an end face, a first pin sleeve and a second pin sleeve, wherein the first pin sleeve and a second pin sleeve each protrude from the end face;
   a first heater disposed in the first pin sleeve;
   a temperature sensor disposed in the second pin sleeve and adapted to ascertain a temperature of the medium;
   and a second heater,
   wherein the end face of the cap includes a base area and a first planar area inclined relative to the base area by an angle, and wherein the second heater is arranged on an inner surface of the first planar area.

2. The thermal, flow measuring device of claim 1, wherein the end face of the cap includes a second planar area inclined relative to the base area by the angle, wherein a third heater is arranged on an inner surface of the second planar area.

3. The thermal, flow measuring device of claim 2, wherein the cap has a wall thickness of less than 0.5 mm, at least in a region of the first planar area and/or the second planar area.

4. The thermal, flow measuring device of claim 2, further comprising: an evaluation unit equipped to detect a sensor drift based on power-proportional measured values ascertained for the second heater and/or the third heater.

5. The thermal, flow measuring device of claim 2, further comprising: an evaluation unit equipped for flow direction detection of the medium based on power-proportional measured values ascertained for the second heater and the third heater.

6. The thermal, flow measuring device of claim 1, wherein the sensor housing has a longitudinal axis and a first cutting plane, on which the longitudinal axis is arranged, wherein the cap is mirror-symmetric about a first symmetry plane, which is coincident with the first cutting plane.

7. The thermal, flow measuring device of claim 6, wherein the sensor housing has a second cutting plane arranged on the longitudinal axis, wherein the cap mirror-symmetric about a second symmetry plane, which is incident with the second cutting plane, and wherein the first cutting plane and the second cutting plane are perpendicular to one another.

8. The thermal, flow measuring device of claim 1, wherein the sensor housing has a cutting plane, which is arranged perpendicular to a longitudinal axis of the sensor housing, and wherein the angle is greater than 5°, relative to the cutting plane.

9. The thermal, flow measuring device of claim 8, wherein the angle is between 10° and 70°, relative to the cutting plane.

10. The thermal, flow measuring device of claim 8, wherein the angle is between 35° and 55°, relative to the cutting plane.

11. The thermal, flow measuring device of claim 1, wherein the first pin sleeve and second pin sleeve are part of the cap, wherein the cap is embodied as a monolithic component.

12. The thermal, flow measuring device of claim 1, wherein the cap has a variable wall thickness such that a difference between thicknesses of individual sections of the cap is less than 0.1 mm.

* * * * *